US010208681B2

(12) United States Patent
Son et al.

(10) Patent No.: US 10,208,681 B2
(45) Date of Patent: Feb. 19, 2019

(54) CONTINUOUS VARIABLE VALVE TIMING APPARATUS AND ENGINE PROVIDED WITH THE SAME

(71) Applicant: Hyundai Motor Company, Seoul (KR)

(72) Inventors: You Sang Son, Suwon-si (KR); Woong Kim, Hwaseong-si (KR); Kyoung Pyo Ha, Seongnam-si (KR); Back Sik Kim, Osan-si (KR); Dongheon Park, Seongnam-si (KR)

(73) Assignee: Hyundai Motor Company, Seoul (KR)

( * ) Notice: Subject to any disclaimer, the term of this patent is extended or adjusted under 35 U.S.C. 154(b) by 159 days.

(21) Appl. No.: 15/366,101

(22) Filed: Dec. 1, 2016

(65) Prior Publication Data

US 2017/0284314 A1 Oct. 5, 2017

(30) Foreign Application Priority Data

Mar. 31, 2016 (KR) .................. 10-2016-0039395

(51) Int. Cl.
| | |
|---|---|
| *F01L 1/34* | (2006.01) |
| *F02D 13/02* | (2006.01) |
| *F01L 1/053* | (2006.01) |
| *F01L 1/08* | (2006.01) |
| *F01L 1/344* | (2006.01) |
| *F01M 9/10* | (2006.01) |
| *F01M 11/02* | (2006.01) |

(52) U.S. Cl.
CPC .......... *F02D 13/0219* (2013.01); *F01L 1/053* (2013.01); *F01L 1/08* (2013.01); *F01L 1/34413* (2013.01); *F01M 9/10* (2013.01); *F01M 9/102* (2013.01); *F01M 9/109* (2013.01); *F01M 11/02* (2013.01); *F01L 2001/0537* (2013.01); *F01M 2011/026* (2013.01); *Y02T 10/18* (2013.01)

(58) Field of Classification Search
CPC ... F02D 13/0219; F01L 1/053; F01L 1/34413; F01L 1/08; F01L 2001/0537; F01M 9/10; F01M 11/02; F01M 2011/026; F01M 9/102; F01M 9/109; Y02T 10/18
See application file for complete search history.

(56) References Cited

U.S. PATENT DOCUMENTS 5,924,334 A  7/1999  Hara et al.

FOREIGN PATENT DOCUMENTS

| EP | 2 322 771 A1 | 5/2011 |
|---|---|---|
| JP | 4259512 B2 | 4/2009 |

(Continued)

*Primary Examiner* — Zelalem Eshete
(74) *Attorney, Agent, or Firm* — Morgan, Lewis & Bockius LLP

(57) ABSTRACT

A continuous variable valve timing apparatus may include a camshaft, a cam device on which a cam is formed respectively and of which the camshaft is inserted thereto, wherein a relative phase angle with respect to the camshaft is variable, an inside bracket configured to transmit rotation of the camshaft to the cam device, a lifter in which the inside bracket is rotatably inserted therein and on which a cylinder opening and a shaft opening are formed thereon, a control shaft parallel to the camshaft and to which a control rod, inserted into the shaft opening, is eccentrically formed, a control cylinder on which a control rod opening where the control rod is inserted therein is formed and inserted into the cylinder opening, a guide portion guiding movement of the lifter and a controller selectively rotating the control shaft, wherein the lifter may move.

19 Claims, 14 Drawing Sheets

(56) References Cited

FOREIGN PATENT DOCUMENTS

| | | | |
|---|---|---|---|
| JP | 5582195 | B2 | 7/2014 |
| KR | 10-1998-0071049 | A | 10/1998 |
| KR | 10-1326818 | B1 | 11/2013 |

CONTINUOUS VARIABLE VALVE TIMING APPARATUS AND ENGINE PROVIDED WITH THE SAME

CROSS-REFERENCE TO RELATED APPLICATION

The present application claims priority to Korean Patent Application No. 10-2016-0039395 filed on Mar. 31, 2016, the entire contents of which is incorporated herein for all purposes by this reference.

BACKGROUND OF THE INVENTION

Field of the Invention

The present invention relates to a continuous variable valve timing apparatus and an engine provided with the same. More particularly, the present invention relates to a continuous variable valve timing apparatus an engine provided with the same which may vary opening duration of a valve according to operation conditions of an engine with a simple construction.

Description of Related Art

An internal combustion engine generates power by burning fuel in a combustion chamber in an air media drawn into the chamber. Intake valves are operated by a camshaft in order to intake the air, and the air is drawn into the combustion chamber while the intake valves are open. In addition, exhaust valves are operated by the camshaft, and a combustion gas is exhausted from the combustion chamber while the exhaust valves are open.

Optimal operation of the intake valves and the exhaust valves depends on a rotation speed of the engine. That is, an optimal lift or optimal opening/closing timing of the valves depends on the rotation speed of the engine. In order to achieve such optimal valve operation depending on the rotation speed of the engine, various researches, such as designing of a plurality of cams and a continuous variable valve lift (CVVL) that can change valve lift according to engine speed, have been undertaken.

Also, in order to achieve such an optimal valve operation depending on the rotation speed of the engine, research has been undertaken on a continuously variable valve timing (CVVT) apparatus that enables different valve timing operations depending on the engine speed. The general CVVT may change valve timing with a fixed valve opening duration.

However, the general CVVL and CVVT are complicated in construction and are expensive in manufacturing cost.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directly providing a continuous variable valve timing apparatus and an engine provided with the same which may vary opening or closing timing of a valve according to operation conditions of an engine, with a simple construction.

A continuous variable valve timing apparatus according to an exemplary embodiment of the present invention may include a camshaft, a cam device on which a cam is formed respectively and of which the camshaft is inserted thereto such that a relative phase angle with respect to the camshaft is variable, an inside bracket configured to transmit rotation of the camshaft to the cam device, a lifter in which the inside bracket is rotatably inserted therein and on which a cylinder hole and a shaft hole are formed thereon, a control shaft parallel to the camshaft and to which a control rod, inserted into the shaft hole, is eccentrically formed, a control cylinder on which a control rod hole where the control rod is inserted therein is formed and inserted into the cylinder hole, a guide portion guiding movement of the lifter and a controller selectively rotating the control shaft such that the lifter may move.

The lifter may include a lifter body in which the inside bracket is rotatably inserted therein and a lifter head on which a guide hole is formed thereto and connected with the lifter body.

The guide portion may include a guide bar inserted into the guide hole and a guide bracket supporting the guide bar.

First and second sliding holes may be formed at the inside bracket, a slider pin connected to the camshaft may be rotatably inserted into the first sliding hole, a cam key may be formed at the cam device, and a cam key pin may be rotatably inserted into the second sliding hole, wherein a cam key slot is formed on the cam key pin, and the cam key is slidably inserted into the cam key slot.

The slider pin may include a pin body slidably inserted into the camshaft and a pin head rotatably inserted into the first sliding hole, wherein the pin body and the pin head may be integrally or monolithically formed.

A camshaft oil hole may be formed in the camshaft along a longitudinal direction thereof, a body oil hole may be formed in the pin body and configured to fluidically-communicate with the camshaft oil hole and an oil groove may be formed in the pin head and configured to fluidically-communicate with the body oil hole.

The cam device may include a first cam portion disposed corresponding to a first cylinder and a second cam portion disposed corresponding to a second cylinder adjacent the first cylinder, and the inside bracket may include first and second inside brackets configured to transmit rotation of the camshaft to the first and second cam portions respectively.

The continuously variable valve timing apparatus may further include a bearing disposed within the lifter and supports the first and the second bracket.

The first inside bracket and the second inside bracket may be connected to each other.

The cam may be formed on the first and the second cam portions as a pair, a cam cap connecting portion is formed between the paired cams of each of the first and second cam portions, and a cam supporting portion configured to rotatably support the cam cap connecting portion is formed on the cam cap.

A shaft hole in which the control shaft is inserted may be formed in the cam cap.

The continuously variable valve timing apparatus may further include a shaft bearing inserted into the shaft hole and rotatably supporting the control shaft.

An engine according to an exemplary embodiment of the present invention may be provided with the continuously variable valve timing apparatus.

The cam device may include a first cam portion disposed corresponding to a first cylinder and a second cam portion disposed corresponding to a second cylinder adjacent the first cylinder, and the inside bracket may include first and second inside brackets configured to transmit rotation of the camshaft to the first and second cam portions respectively and the first and second inside brackets may be disposed to the lifter.

The first inside bracket and the second inside bracket may be connected to each other.

The lifter may include a lifter body in which the inside bracket is rotatably inserted therein and a lifter head on which a guide hole is formed thereto and connected with the lifter body.

The guide portion may include a guide bar inserted into the guide hole and a guide bracket supporting the guide bar.

First and second sliding holes may be formed at the inside bracket, a slider pin connected to the camshaft may be rotatably inserted into the first sliding hole, a cam key may be formed at the cam device, and a cam key pin may be rotatably inserted into the second sliding hole, wherein a cam key slot is formed on the cam key pin, and the cam key is slidably inserted into the cam key slot, wherein the slider pin may include a pin body slidably inserted into the camshaft and a pin head rotatably inserted into the first sliding hole, wherein the pin body and the pin head may be integrally or monolithically formed.

A camshaft oil hole may be formed in the camshaft along a longitudinal direction thereof, a body oil hole may be formed in the pin body and configured to fluidically-communicate with the camshaft oil hole and an oil groove may be formed in the pin head and configured to fluidically-communicate with the body oil hole.

The cam may be formed on the first and the second cam portions as a pair, and a cam cap connecting portion may be formed between the paired cams of each of the first and second cam portions, and a cam supporting portion configured to rotatably support the cam cap connecting portion may be formed on the cam cap.

As described above, the continuous variable valve timing apparatus according to an exemplary embodiment of the present invention may vary an opening/closing timing of a valve according to operation conditions of an engine, with a simple construction.

The exemplary continuous variable valve timing apparatus of the present invention may be reduced in size and thus the entire height of a valve train may be reduced.

Since the continuous variable valve timing apparatus may be applied to an existing engine without excessive modification, thus productivity may be enhance and production cost may be reduced.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
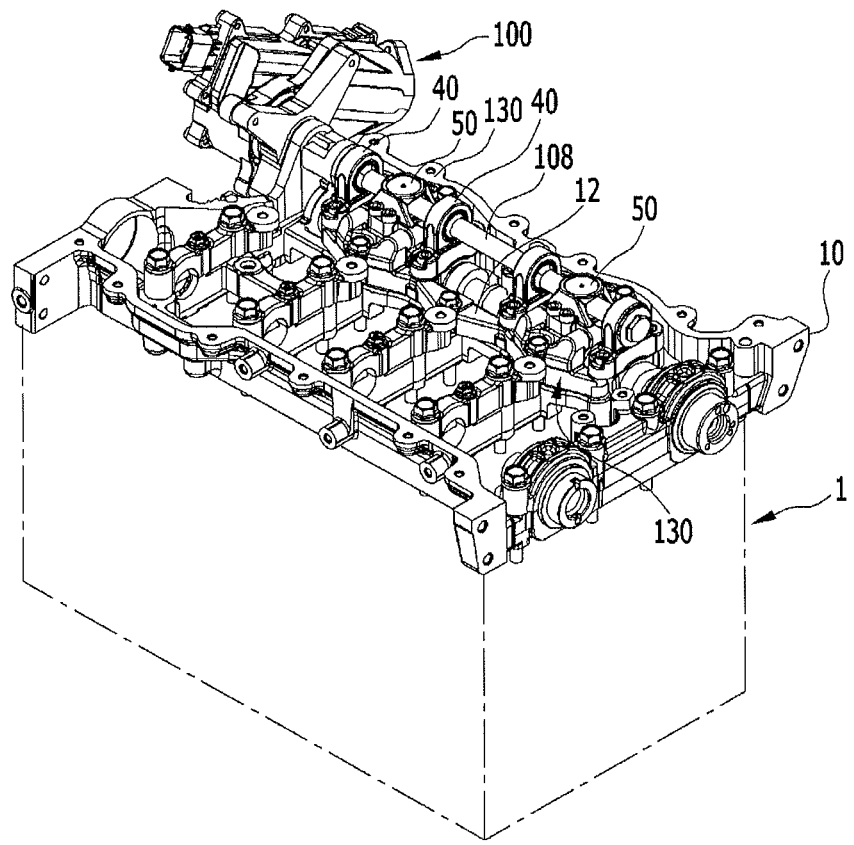
FIG. 1 is a perspective view of an engine provided with a continuous variable valve timing apparatus according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

In the following detailed description, only certain exemplary embodiments of the present invention have been shown and described, simply by way of illustration.

As those skilled in the art would realize, the described embodiments may be modified in various different ways, all without departing from the spirit or scope of the present invention A part irrelevant to the description will be omitted to clearly describe the present invention, and the same or similar elements will be designated by the same reference numerals throughout the specification.

In the drawings, the thickness of layers, films, panels, regions, etc., are exaggerated for clarity.

Throughout the specification and the claims, unless explicitly described to the contrary, the word "comprise" and variations such as "comprises" or "comprising", will be understood to imply the inclusion of stated elements but not the exclusion of any other elements.

An exemplary embodiment of the present invention will hereinafter be described in detail with reference to the accompanying drawings.

Figure 2:
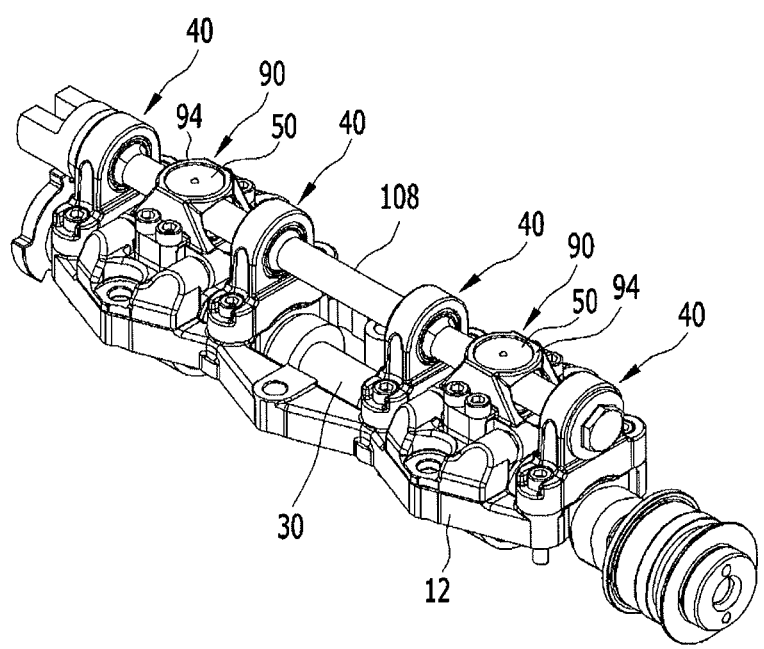
FIG. 2 is a perspective view of a continuous variable valve timing apparatus according to an exemplary embodiment of the present invention.

FIG. 1 is a perspective view of an engine provided with a continuous variable valve timing apparatus according to an exemplary embodiment of the present invention and FIG. 2 is a perspective view of a continuous variable valve timing apparatus according to an exemplary embodiment of the present invention.

Figure 3:
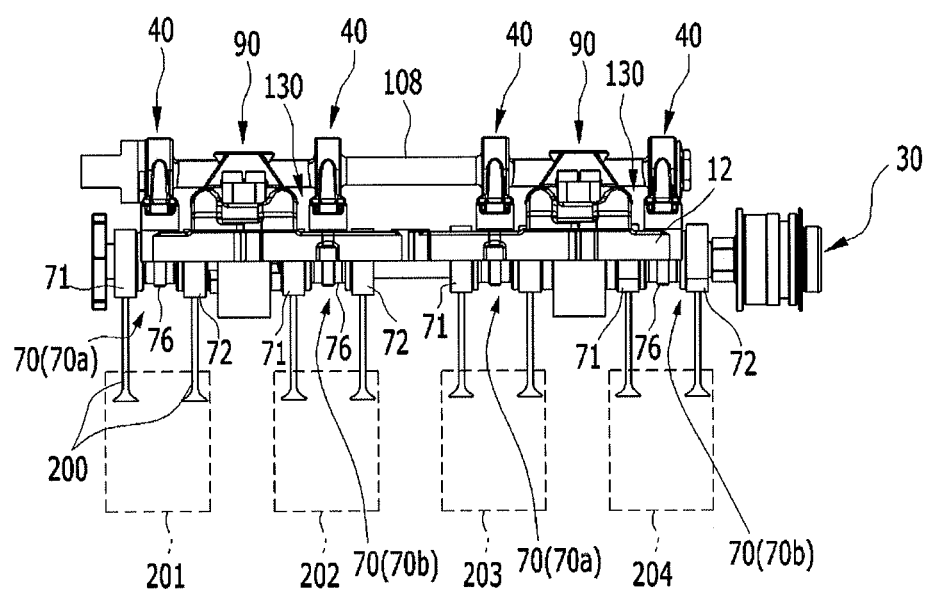
FIG. 3 is a side view of a continuous variable valve timing apparatus according to an exemplary embodiment of the present invention.
Figure 4:
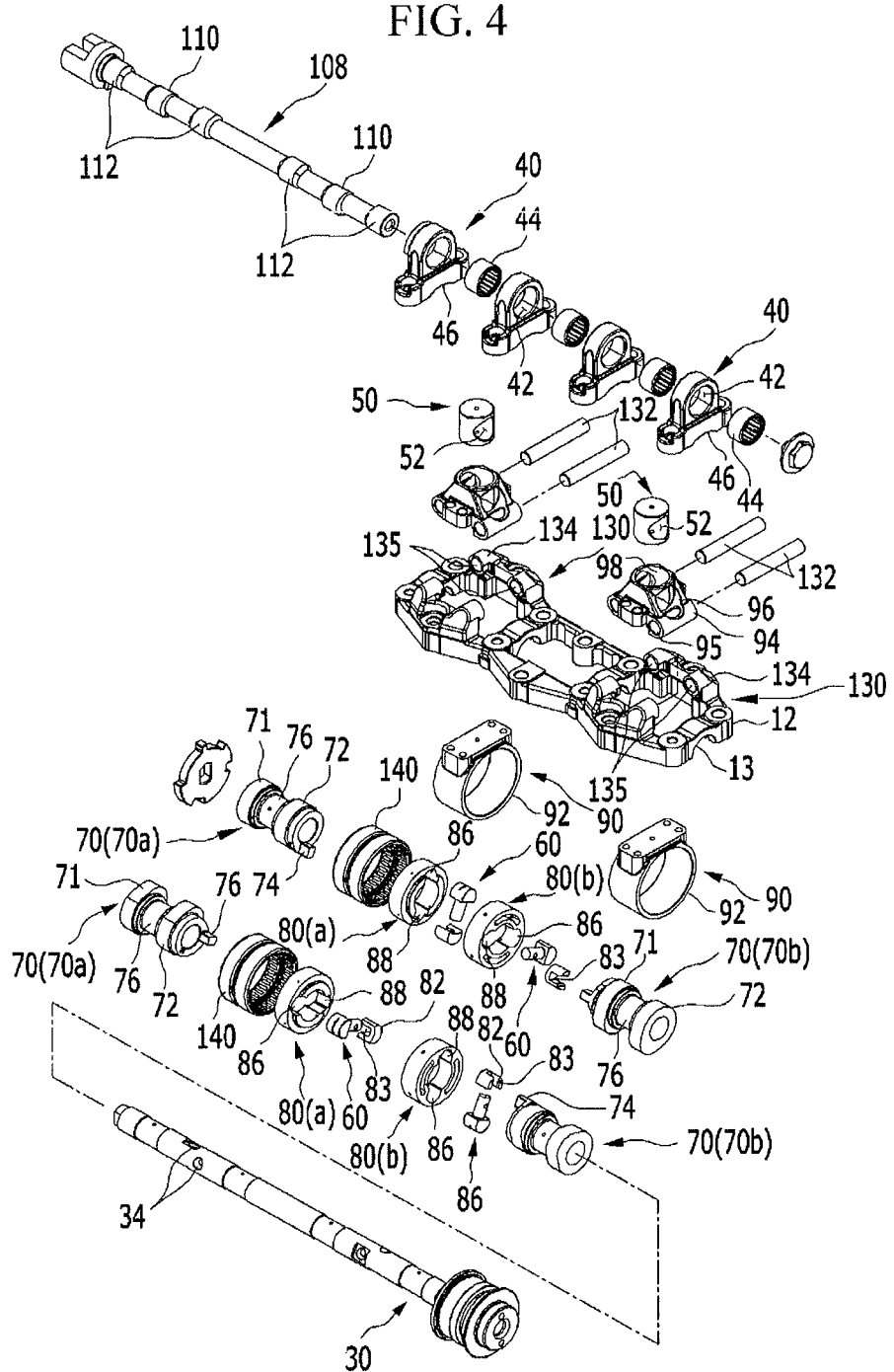
FIG. 4 is an exploded perspective view of a continuous variable valve timing apparatus according to an exemplary embodiment of the present invention.

FIG. 3 is a side view of a continuous variable valve timing apparatus according to an exemplary embodiment of the present invention and FIG. 4 is an exploded perspective view of a continuous variable valve timing apparatus according to an exemplary embodiment of the present invention.

Figure 5:
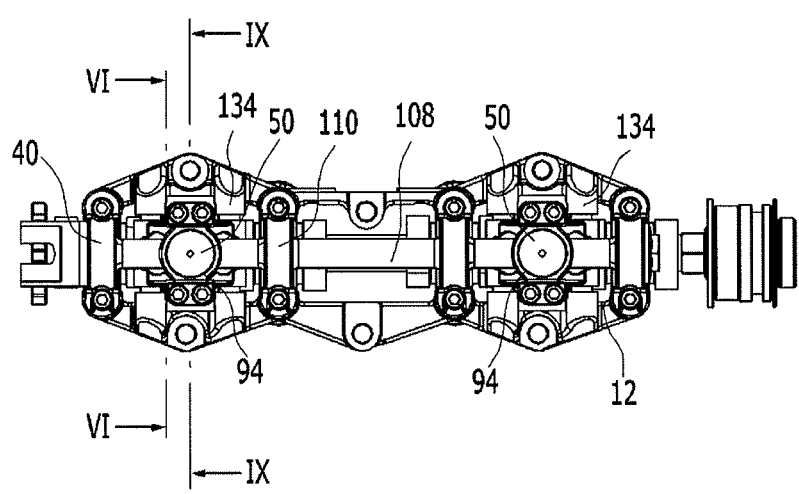
FIG. 5 is a top plan view of a continuous variable valve timing apparatus according to an exemplary embodiment of the present invention.
Figure 6:
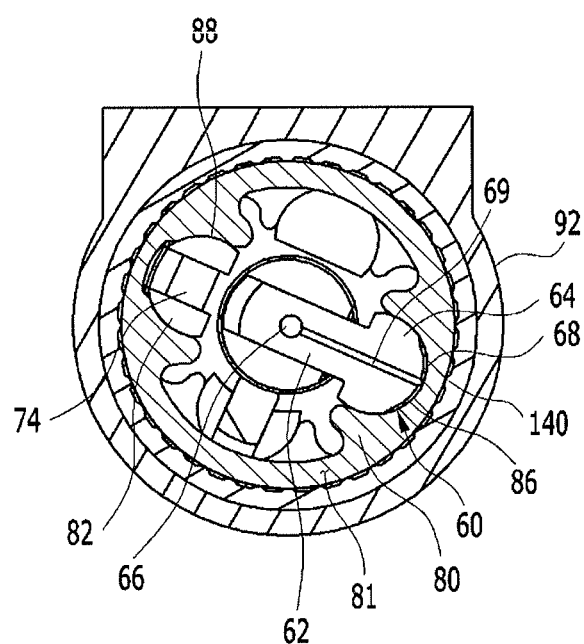
FIG. 6 is a cross-sectional view along line of VI-VI of FIG. 5.

FIG. 5 is a top plan view of a continuous variable valve timing apparatus according to an exemplary embodiment of the present invention and FIG. 6 is a cross-sectional view along line of VI-VI of FIG. 5.

Figure 7:
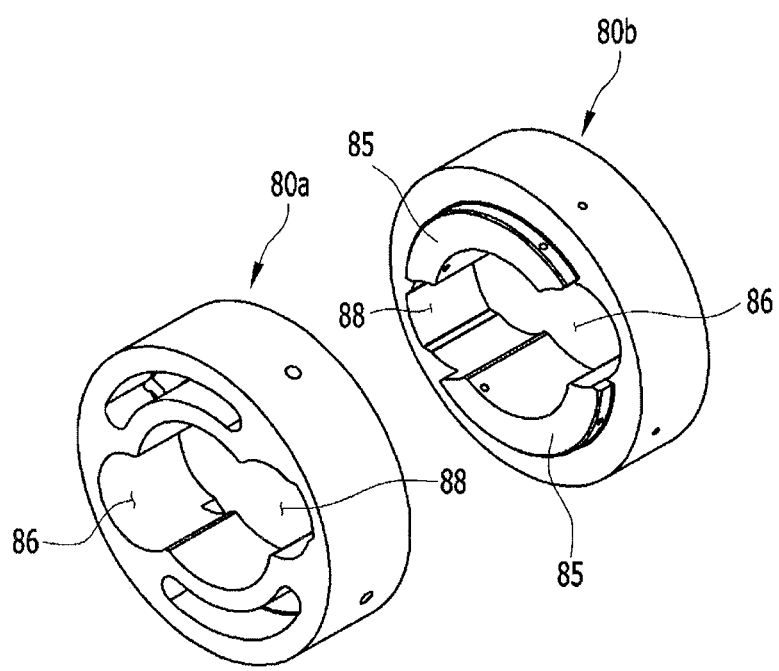
FIG. 7 and FIG. 8 are drawings showing an inside bracket of a continuous variable valve timing apparatus according to an exemplary embodiment of the present invention.
Figure 8:
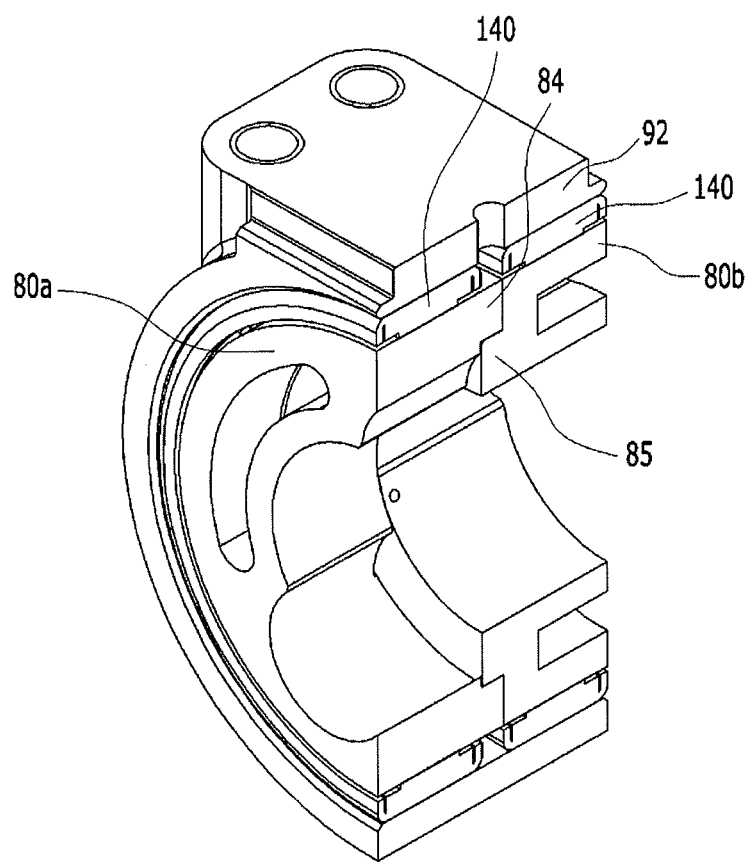

FIG. 7 and FIG. 8 are drawings showing an inside bracket of a continuous variable valve timing apparatus according to an exemplary embodiment of the present invention.

FIG. 1 to referring to FIG. 7, an engine 1 according to an exemplary embodiment of the present invention is provided with a continuously variable valve timing apparatus and the continuously variable valve timing apparatus is mounted to the engine 1 through a cam carrier 10.

In the drawing, 4 cylinders 211, 212, 213 and 214 are formed at the engine 1, but it is not limited thereto.

A continuous variable valve timing apparatus according to an exemplary embodiment of the present invention include a camshaft 30, a cam device 70 on which a cam 71 is formed respectively and of which the camshaft 30 is inserted thereto such that a relative phase angle with respect to the camshaft 30 is variable, an inside bracket 80 configured to transmit rotation of the camshaft 30 to the cam device 70, a lifter 90 in which the inside bracket 80 is rotatably inserted therein and on which a cylinder hole 98 and a shaft hole 96 are formed thereon, a control shaft 108 parallel to the camshaft 30 and to which a control rod 110, inserted into the shaft hole 96, is eccentrically formed, a control cylinder 50 on which a control rod hole 52 where the control rod 110 is inserted therein is formed and inserted into the cylinder hole 98, a guide portion 130 guiding movement of the lifter 90 and a controller 100 selectively rotating the control shaft 108 such that the lifter 90 may move.

The camshaft 30 may be an intake camshaft or an exhaust camshaft.

The lifter 90 includes a lifter body 92 in which the inside bracket 80 is rotatably inserted therein and a lifter head 94 on which a guide hole 95 is formed thereto and connected with the lifter body 92.

The cylinder hole 98 and the shaft hole 96 are formed the lifter head 94.

The guide portion 130 includes a guide bar 132 inserted into the guide hole 95 and a guide bracket 134 supporting the guide bar 132.

A guide bracket hole 135 is formed at the guide bracket 134 and the guide bar 132 is connected to the guide bracket hole 135.

The guide bracket 134 may be connected to the cam carrier 10 through a cam carrier bracket 12 and a camshaft supporting hole 13 is formed at the cam carrier bracket 12 for rotatably supporting the camshaft 30.

First and second sliding holes 86 and 88 are formed at the inside bracket 80, a slider pin 60 connected to the camshaft 30 is rotatably inserted into the first sliding hole 86 and a cam key 74 is formed at the cam device 70. And a cam key pin 82 is rotatably inserted into the second sliding hole 88, wherein a cam key slot 83 is formed on the cam key pin 82, and the cam key 74 is slidably inserted into the cam key slot 83.

The slider pin 60 includes a pin body 62 slidably inserted into the camshaft 30 and a pin head 64 rotatably inserted into the first sliding hole 86, wherein the pin body 62 and the pin head 64 may be integrally or monolithically formed.

A camshaft hole 34 is formed at the camshaft 30, the pin body 62 of the slider pin 60 is slidably inserted into the camshaft hole 34 and the pin head 64 is rotatably inserted into the first sliding hole 86.

A camshaft oil hole 32 is formed in the camshaft 30 along a longitudinal direction thereof, a body oil hole 66 formed in the pin body 62 and configured to fluidically-communicate with the camshaft oil hole 32 and an oil groove 68 is formed in the pin head 64 and configured to fluidically-communicate with the body oil hole 66 through a communication hole 69 formed within the slider pin 60.

Lubricant supplied to the camshaft oil hole 32 may be smoothly supplied to the inside bracket 80 through the body oil hole 66, the communication hole 69 and the oil groove 68.

The cam device 70 includes a first cam portion 70a disposed corresponding to one cylinder, for example the first cylinder 201 and a second cam portion 70b disposed corresponding to the adjacent cylinder, for example the second cylinder 202 adjacent the first cylinder 201. And the inside bracket 80 includes first and second inside brackets 80a and 80b configured to transmit rotation of the camshaft 30 to the first and second cam portions 70a and 70b respectively.

The continuously variable valve timing apparatus may further include a bearing 140 disposed within the lifter 90 and supports the first and the second bracket 80a and 80b.

The bearing 140 may be a double raw bearing, the first and the second inside brackets 80a and 80b may be disposed within the double raw bearing 140 such that the first and the second inside brackets 80a and 80b may rotate without interference.

Since within one lifter 90 the first and the second inside brackets 80a and 80b may be disposed thus element number may be reduced, productivity may be improved and space for the apparatus may be reduced.

FIG. 7 and FIG. 8 are drawings showing an inside bracket of a continuous variable valve timing apparatus according to an exemplary embodiment of the present invention.

Referring to FIG. 7 and FIG. 8, the first inside bracket 80a and the second inside bracket 80b disposed within the lifter 90 may be connected to each other. For example, a first inside bracket connector 84 and a second inside bracket connector 85 are formed at the first inside bracket 80a and the second inside bracket 80b respectively, and the first inside bracket connector 84 and second inside bracket connector 85 are connected.

In the drawing, the first inside bracket connector 84 and the second inside bracket connector 85 are formed as convex shape and concave shape respectively, but it is not limited thereto.

In the case that the first inside bracket 80a and the second inside bracket 80b are connected, looseness or vibration due to manufacturing tolerances of the bearing, the inside bracket, the lifter and so on may be reduced.

Two cam 71 and 72 may be formed on the first and the second cam portions 70a and 70b as a pair and a cam cap connecting portion 76 is formed between the paired cams 71 and 72 of each of the first and second cam portions 70a and 70b.

The cam 71 and 72 rotate and open the valve 200.

The continuously variable valve timing apparatus further includes a cam cap 40 on which a cam supporting portion 46 configured to rotatably support the cam cap connecting portion 76 is formed on the cam cap 40.

A shaft hole 42 in which the control shaft 108 is inserted is formed in the cam cap 40 and a shaft bearing 44 rotatably supporting the control shaft 108 is inserted into the shaft hole 42.

A supporting rod 112 is formed at the control shaft 108 and the shaft bearing 44 may rotatably support the supporting rod 112.

In FIG. 1 to FIG. 4, the continuously variable valve timing apparatus according to an exemplary embodiment of the present invention is applied to the engine 1 with four cylinders 201, 202, 203 and 204, but is not limited thereto. The continuously variable valve timing apparatus according to an exemplary embodiment of the present invention may be applied to an engine with 6 or more cylinders.

Figure 9:
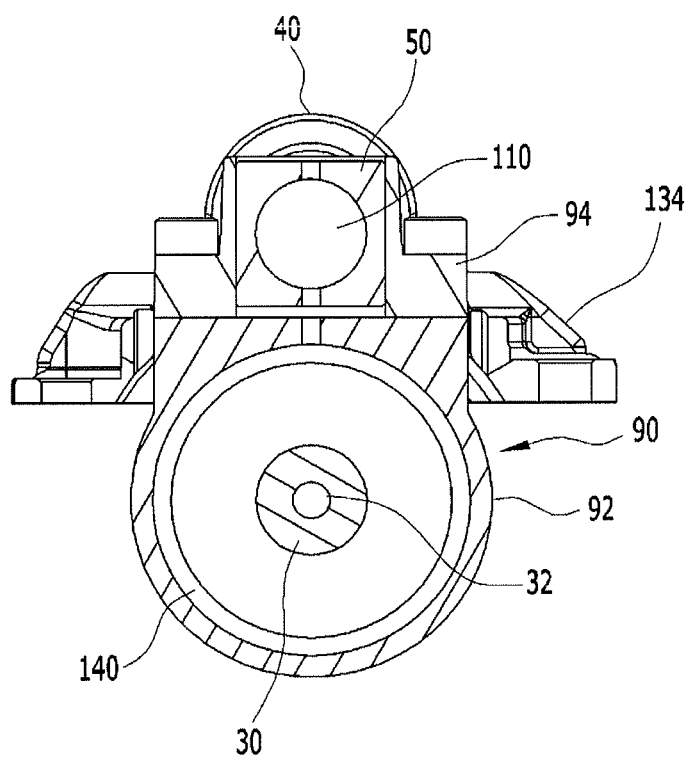
FIG. 9, FIG. 10 and FIG. 11 are cross-sectional views along line of VII-VII of FIG. 5.
Figure 10:
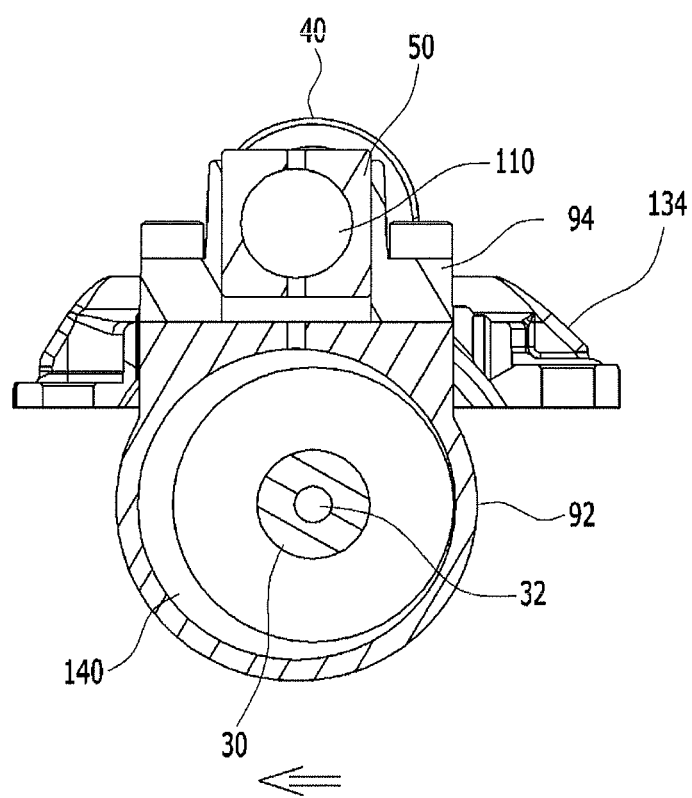
Figure 11:
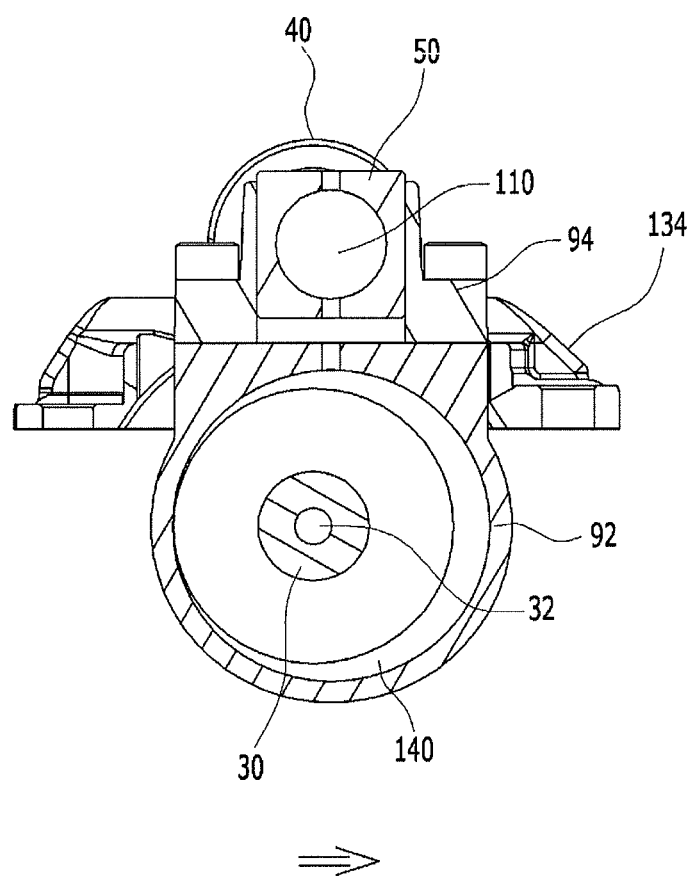

FIG. 9 to FIG. 11 are cross-sectional views along line of VII-VII of FIG. 5.

Figure 12:
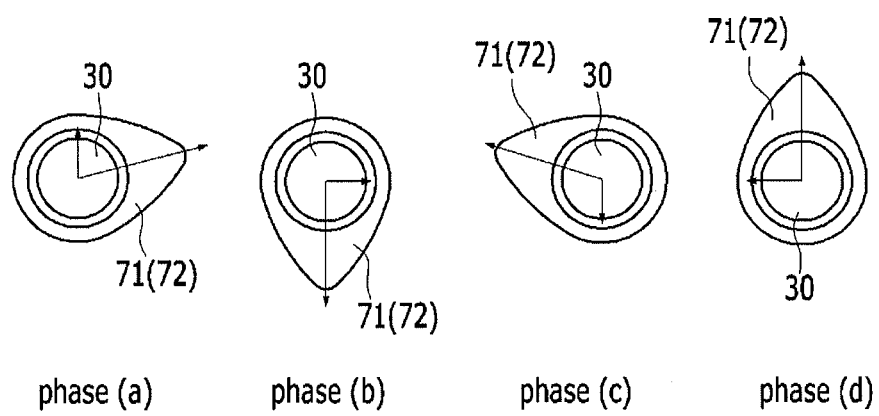
FIG. 12 and FIG. 13 are drawings showing operations of a continuous variable valve timing apparatus according to an exemplary embodiment of the present invention.
Figure 13:
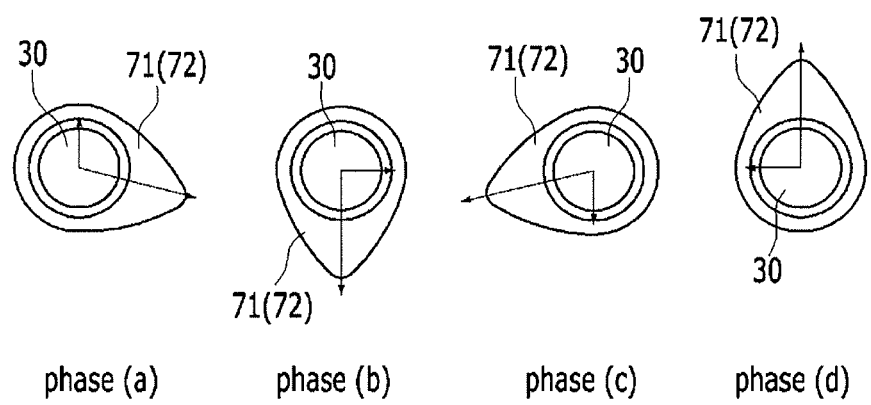

FIG. 12 and FIG. 13 are drawings showing operations of a continuous variable valve timing apparatus according to an exemplary embodiment of the present invention.

As shown in FIG. 9, when rotation centers of the camshaft 30 and the cam device 70 are coincident, the cams 71 and 72 rotate with the same phase angle of the camshaft 30.

According to engine operation states, an engine control unit (ECU) or electric control unit) transmits control signals to the controller 100 to rotate the control shaft 108.

Then, the control rod 110 eccentrically formed at the control shaft 108 rotates, up and down direction displacement of the control rod 110 induces up and down direction displacement of the control cylinder 50 and left and right direction displacement of the control rod 110 induces left and right direction displacement of the lifter 90 as shown in FIG. 10 and FIG. 11.

When the lifter 90 moves one direction with respect to the rotation center of the camshaft 30 as shown in FIG. 12 the rotation speed of the cams 71 and 73 is relatively faster than rotation speed of the camshaft 30 from phase a to phase b and from phase b to phase c, then the rotation speed of the cams 71 and 73 is relatively slower than rotation speed of the camshaft 30 from phase c to phase d and from phase d to phase a.

When the lifter 90 moves the other direction with respect to the rotation center of the camshaft 30 as shown in FIG. 13, the rotation speed of the cams 71 and 73 is relatively slower than rotation speed of the camshaft 30 from phase a to phase b and from phase b to phase c, then the rotation speed of the cams 71 and 73 is relatively faster than rotation speed of the camshaft 30 from phase c to phase d and from phase d to phase a.

While the slider pin 60 is rotated with the camshaft 30, the pin body 62 is slidable within the camshaft hole 34, the pin head 64 is rotatable within the first sliding hole 86, the cam pin 84 is rotatably within the second sliding hole 88 and the cam key 74 is slidable within the cam key slot 83. Thus, the relative rotation speed of the cams 71 and 73 with respect to the rotation speed of the camshaft 30 is changed.

Figure 14:
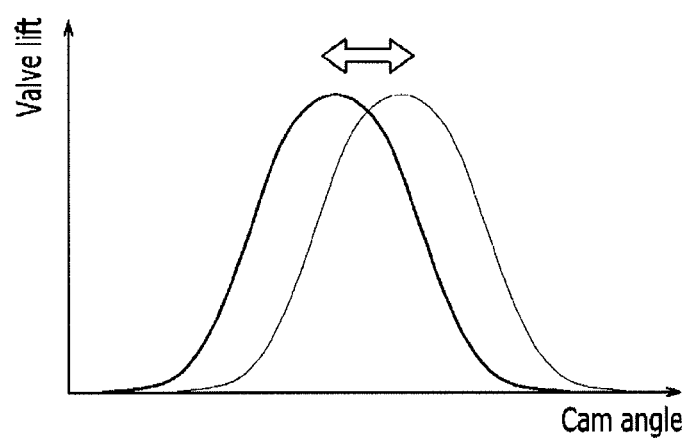
FIG. 14 is a graph showing valve profiles of a continuous variable valve timing apparatus according to an exemplary embodiment of the present invention.

FIG. 14 is a graph showing valve profiles of a continuous variable valve timing apparatus according to an exemplary embodiment of the present invention.

As shown in FIG. 14, although maximum lift of the valve 200 is constant, however rotation speed of the cam 71 and 73 with respect to the rotation speed of the camshaft 30 is changed according to relative positions of the lifter 90 so that closing and opening time of the valve 200 is changed. That is, valve timing is changed.

In FIG. 14, while opening and closing time of the valve 200 are changed, duration of the valve 200 is constant, it is not limited thereto. According to various mounting angle of the cams 71 and 73 and the valve 200, various contacting angles between cam lobe of the cams 71 and 73 and the valve 200 and so on, various valve duration/timing may be performed.

That is, according to contacting positions of the valve 200 and the cams 71 and 73, opening timing of the valve 200 may be constant, closing timing of the valve 200 may be advanced or retarded.

Or, according to contacting positions of the valve 200 and the cams 71 and 73, closing timing of the valve 200 may be constant, opening timing of the valve 200 may be advanced or retarded.

As described above, a continuous variable valve timing apparatus according to an exemplary embodiment of the present invention may vary an opening duration of a valve according to operation conditions of an engine, with a simple construction.

The continuous variable valve timing apparatus according to an exemplary embodiment of the present invention may be reduced in size and thus the entire height of a valve train may be reduced.

Since the continuous variable valve timing apparatus may be applied to an existing engine without excessive modification, thus productivity may be enhance and production cost may be reduced.

Since the body oil hole 66 and the oil groove 68 are formed at the slider pin 60, lubricant may be smoothly supplied to rotation elements including the inside brackets For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A continuous variable valve timing apparatus comprising:
   a camshaft;
   a cam device on which a cam is formed respectively and of which the camshaft is inserted thereto, wherein a relative phase angle with respect to the camshaft is variable;
   an inside bracket configured to transmit rotation of the camshaft to the cam device;

a lifter in which the inside bracket is rotatably inserted therein and on which a cylinder opening and a shaft opening are formed thereon;
a control shaft parallel to the camshaft and to which a control rod, inserted into the shaft opening, is eccentrically formed;
a control cylinder on which a control rod opening where the control rod is inserted therein is formed and inserted into the cylinder opening;
a guide portion guiding movement of the lifter; and
a controller selectively rotating the control shaft, wherein the lifter is configured to move,
wherein first and second sliding openings are formed at the inside bracket,
wherein a slider pin connected to the camshaft is rotatably inserted into the first sliding opening,
wherein cam key is formed at the cam device, and
wherein a cam key pin is rotatably inserted into the second sliding opening, wherein a cam key opening is formed on the cam key pin, and the cam key is slidably inserted into the cam key opening.

2. The continuously variable valve timing apparatus of claim 1, wherein the lifter includes:
a lifter body in which the inside bracket is rotatably inserted therein; and
a lifter head on which a guide opening is formed thereto and connected with the lifter body.

3. The continuously variable valve timing apparatus of claim 2, wherein the guide portion includes:
a guide bar inserted into the guide opening; and
a guide bracket supporting the guide bar.

4. The continuously variable valve timing apparatus of claim 1, wherein the slider pin includes:
a pin body slidably inserted into the camshaft; and
a pin head rotatably inserted into the first sliding opening,
wherein the pin body and the pin head are integrally or monolithically formed.

5. The continuously variable valve timing apparatus of claim 4, wherein
a camshaft oil opening is formed in the camshaft along a longitudinal direction thereof,
a body oil opening is formed in the pin body and configured to fluidically-communicate with the camshaft oil opening and
an oil groove is formed in the pin head and configured to fluidically-communicate with the body oil opening.

6. The continuously variable valve timing apparatus of claim 1, wherein the cam device includes a first cam portion disposed corresponding to a first cylinder and a second cam portion disposed corresponding to a second cylinder adjacent to the first cylinder, and
the inside bracket includes first and second inside brackets configured to transmit rotation of the camshaft to the first and second cam portions respectively.

7. The continuously variable valve timing apparatus of claim 6, further including a bearing disposed within the lifter and supports the first and second inside brackets.

8. The continuously variable valve timing apparatus of claim 6, wherein the first inside bracket and the second inside bracket are connected to each other.

9. The continuously variable valve timing apparatus of claim 6, wherein the cam is formed on the first cam portion and the second cam portion as a pair,
a cam cap connecting portion is formed between the paired cams of each of the first and second cam portions, and
a cam supporting portion configured to rotatably support the cam cap connecting portion is formed on the cam cap.

10. The continuously variable valve timing apparatus of claim 9, wherein a shaft opening in which the control shaft is inserted is formed in the cam cap.

11. The continuously variable valve timing apparatus of claim 10, further including a shaft bearing inserted into the shaft opening and rotatably supporting the control shaft.

12. An engine provided with the continuously variable valve timing apparatus of claim 1.

13. The engine of claim 12, wherein
the cam device includes a first cam portion disposed corresponding to a first cylinder and a second cam portion disposed corresponding to a second cylinder adjacent the first cylinder, and
the inside bracket includes first and second inside brackets configured to transmit rotation of the camshaft to the first and second cam portions respectively and the first and second inside brackets are disposed to the lifter.

14. The engine of claim 13, wherein the first inside bracket and the second inside bracket are connected to each other.

15. The engine of claim 12, wherein the lifter includes:
a lifter body in which the inside bracket is rotatably inserted therein; and
a lifter head on which a guide opening is formed thereto and connected with the lifter body.

16. The engine of claim 15, wherein the guide portion includes:
a guide bar inserted into the guide opening; and
a guide bracket supporting the guide bar.

17. The engine of claim 12, wherein
wherein the slider pin comprise:
a pin body slidably inserted into the camshaft; and
a pin head rotatably inserted into the first sliding opening,
wherein the pin body and the pin head are integrally or monolithically formed.

18. The engine of claim 17, wherein
a camshaft oil opening is formed in the camshaft along a longitudinal direction thereof,
a body oil opening is formed in the pin body and configured to fluidically-communicate with the camshaft oil opening and
an oil groove is formed in the pin head and configured to fluidically-communicate with the body oil opening.

19. The engine of claim 13, wherein
the cam is formed on the first cam portion and the second cam portion as a pair, and
a cam cap connecting portion is formed between the paired cams of each of the first and second cam portions, and
a cam supporting portion configured to rotatably support the cam cap connecting portion is formed on the cam cap.

* * * * *